Nov. 14, 1967  W. W. KENNEDY  3,352,319

FLOW CONTROLLER

Filed June 30, 1965

INVENTOR.
WALTER W. KENNEDY
BY Wolfe, Hubbard,
Voit & Osann
ATTORNEYS

United States Patent Office 3,352,319
Patented Nov. 14, 1967

3,352,319
FLOW CONTROLLER
Walter W. Kennedy, Rockford, Ill., assignor to Barber-Colman Company, Rockford, Ill., a corporation of Illinois
Filed June 30, 1965, Ser. No. 468,200
5 Claims. (Cl. 137—503)

ABSTRACT OF THE DISCLOSURE

A controller for maintaining the rate of flow of a gas through a duct at a constant volume and including a bellows mounted on the outlet end of the duct and formed by a first disk on the duct, a second disk spaced from the end of the duct and supported thereon by a spring-linkage yieldably urged toward the duct, and a freely flexible sleeve fastened at its ends to the respective disks. The second disk moves toward and away from a valve member along guide bars carried on the valve member, and thereby varies the area of the outlet passage between the second disk and the valve member in response to changes in the supply pressure.

---

This invention relates to a controller for automatically maintaining the rate of flow of gas through a duct at a constant volume in spite of variations in the pressure differential inducing the flow through the duct. More particularly, the invention relates to a flow controller of the general type disclosed in Patent No. 3,049,146 in which the outlet area of the controller is varied automatically in response to variations in the inlet pressure and thereby changes the outlet area to compensate for pressure changes.

The general object of the present invention is to improve on the volume controller disclosed in the aforesaid patent and provide a novel similarly acting controller which is simpler and less expensive in construction and quieter in operation.

Another object is to eliminate the need for a curtain or similar member variably movable across the duct to change its size.

A more detailed object is to vary the outlet area of the duct in response to changes in the length of an axially expansible and contractible chamber communicating with the duct and indicating the varying pressure differential by changing its length.

A further object is to utilize the movement of an end wall of the chamber during changes in length of the chamber to operate a valve for varying the outlet area automatically in response to such changes.

Still another object is to support the movable chamber wall in a novel manner for back and forth movement with variations in the pressure differential.

Another object is to balance the pressure differential in a novel manner with a spring force resisting expansion of said chamber.

Other objects and advantages of the invention will become apparent from the following detailed description taken in connection with the accompanying drawings, in which FIGURE 1 is a fragmentary vertical section taken through a controller embodying the novel features of the present invention.

Figure 1:
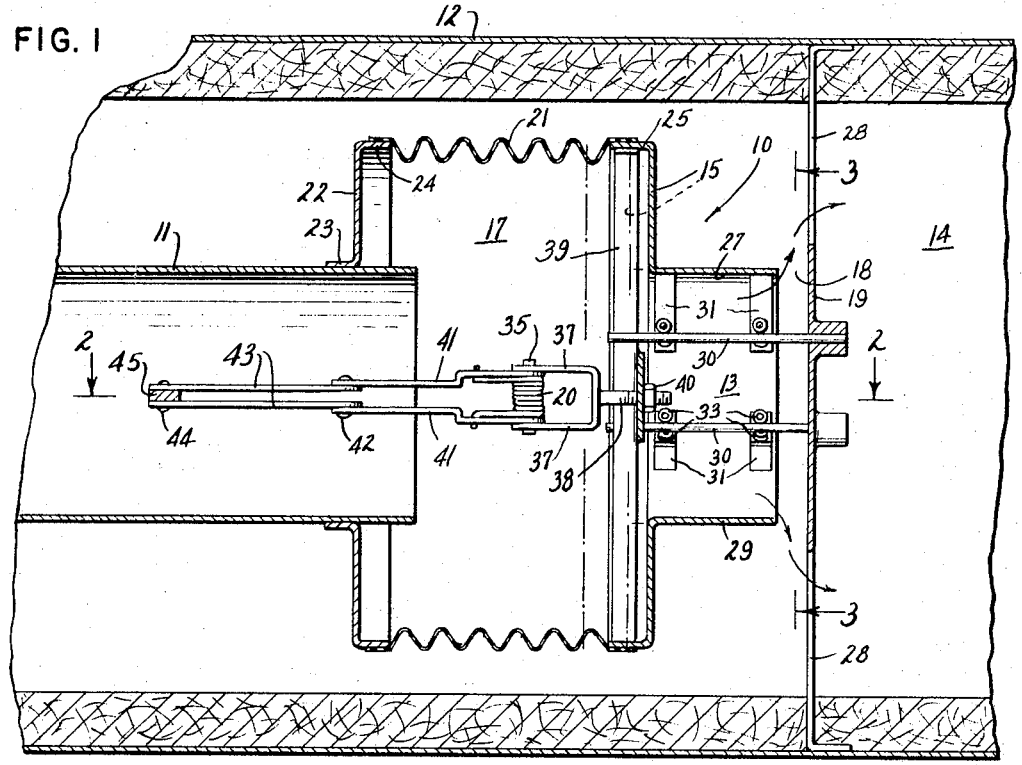

As shown in the drawings for purposes of illustration, the invention is embodied in a controller 10 for maintaining a constant-volume flow of gas such as conditioned air through a duct 11 enclosed in a hollow cylindrical case 12 and delivering air to an outlet 13 from which the air passes through a discharge chamber 14 in the right end (FIG. 1) of the case for delivery to a room space to be conditioned. The duct is adapted to be connected at its left end to a mixing device (not shown) for supplying conditioned air at temperatures selected to maintain the desired room temperature and at pressures of the magnitude commonly used in air conditioning systems.

The volume of air flowing through the controller 10, of course, depends upon both the effective area of the outlet passage of the controller and the pressure differential inducing the flow, hereafter called the supply pressure. By varying the area of the outlet passage through the controller in response to changes in the supply pressure, the flow through the controller may be maintained substantially constant despite relatively wide variations in the supply pressure.

In accordance with the present invention, the outlet 13 is formed in a movable wall 15 of an expansible and contractible chamber 17 communicating with the duct 11 and thus pressurized by the air flowing through the duct, and the outlet passage 18 of variable size is defined between the outlet and a valve plate 19 positioned in the path of movement of the wall and the outlet therein during expansion of the chamber 17 thereby to vary the area of the passage in response to changes in the wall position. A spring 20 urges the movable wall away from the valve plate and thus tends to increase the area of the passage 18.

With this arrangement, increases in the supply pressure expand the chamber 17 to move the outlet 13 closer to the valve plate 19 and reduce the area of the outlet passage 18 by an amount correlated with the pressure increase, while reductions in the supply pressure permit the spring 20 to contract the chamber and shift the outlet away from the valve plate to increase the area of the outlet passage. When the pressure differential is constant and balanced against the spring force, an equilibrium condition exists and the area of the outlet passage remains the same.

In this instance, the chamber 17 is the interior of a bellows comprising an endwise flexible sleeve 21 of internal cross-sectional area substantially larger than the area of the pipe forming the duct 11, the sleeve being fastened at one end to the periphery of an annular disk 22 telescoped onto the outlet end of the duct and at its other end to a similar disk 15 spaced outwardly from the end of the duct and supported on the controller for back and forth broadwise movement relative to the duct. The sleeve is composed of freely flexible material such as axially corrugated rubberized fabric reinforced to prevent radial displacement or sagging of the sleeve but easily expansible and contractible axially of the sleeve.

As shown in FIG. 1, the fixed disk 22 is formed with an inner peripheral flange 23 projecting to the left from the disk to telescope snugly onto the outlet end of the duct 11 and secured to the latter as by welding, and has an outer peripheral flange 24 extending to the right and sized to telescope with the left end of the sleeve 21. The movable disk 15 has an outer flange 25 telescoping with the right end of the sleeve and a center hole 27 preferably the same size as and alined with the outlet end of the duct for a smooth flow of air through the chamber 17. Herein, both flanges 24 and 25 are cemented to the inner surface of the sleeve to mount the sleeve on the disks and form seals around the ends of the sleeve.

While the valve plate 19 may take various forms, herein it is the central imperforate section of a transverse partition mounted in the case beyond the movable disk 15 with the imperforate section alined with the outlet end of the duct 11 and the opening 27 in the movable disk. A plurality of apertures 28 surround the imperforate section and cooperate to form a free flow area for the gas discharged from the controller 10. It will be seen in FIGS. 1 and 2 that the outlet 13 from the chamber 17 is defined by the opening 27 and a tubular pipe 29 secured to the outer side of the movable disk around the outlet opening to project toward the valve plate and thus constituting a relatively movable section or extension of the duct 11. Accordingly, the outlet passage 18 of variable area is the annular passage between the valve plate and the free end of the outlet pipe.

Figure 3:
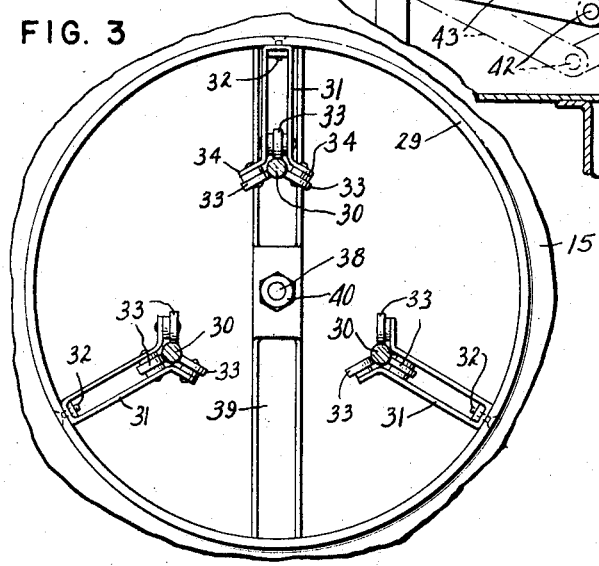
FIG. 3 is an enlarged fragmentary cross-section taken along the line 3—3 of FIG. 1.

To support the disk 15 for substantially free back and forth motion in response to changes in the pressure differential on opposite sides of the disk, one or more guide rods 30 are fastened at their right ends to the valve plate as shown in FIG. 1 with their left end portions projecting into and through the outlet pipe 29 parallel to the direction of movement of the disk. Sheet metal yokes 31 of U-shaped cross-section (see FIG. 3) fastened as by screws 32 to the inner walls of the outlet pipe project radially inwardly toward the guide rods and support sets of rollers 33 angularly spaced around each rod to roll thereon as the disk moves back and forth. In this instance, there are three such rods with two yokes spaced longitudinally apart along each rod and each supporting three rollers equally spaced around the rod. One roller is journaled between the parallel legs of the yoke and the other two are journaled on the outwardly flared end portions 34 of the legs.

The spring 20 for urging the movable wall 15 away from the valve plate 19 may take different forms such as a simple compression spring acting between the valve plate and the disk or a contractile spring acting between the duct and the disk. Herein, the spring is shown as a light torsion spring coiled around a vertical pivot pin 35 spanning the legs 37 of a yoke secured to a stud 38 projecting through the center of a cross bar 39 extending along a diameter of the movable disk 15 and fastened at its ends to the flange 25, the stud being held in place by a nut 40 threaded on its outer end. Two horizontal links 41 are pivoted on the pin 35 to project inwardly into the duct 11 from the pin and are urged away from each other by the free ends of the torsion spring which hooks around the links as shown most clearly in FIG. 2. Pivoted at 42 on the inner ends of the links 41 are two similar horizontal links 43 which converge inwardly and are fulcrumed at their inner ends on a vertical pin 44 supported on a cross bar 45 extending across the inside of the duct and fastened at its ends to the duct wall.

Figure 2:
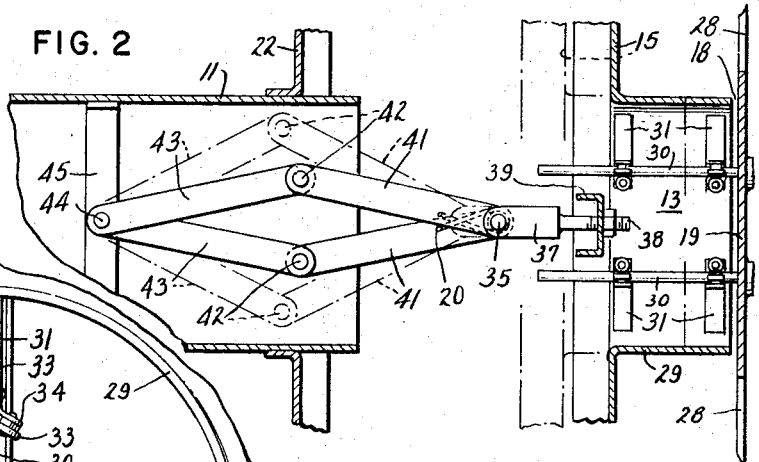
FIG. 2 is a fragmentary cross-sectional view taken substantially along the line 2—2 of FIG. 1 with the parts in moved positions.

Thus, it will be seen that the links 41 and 43 are arranged in a parallelogram linkage or double toggle joint which is urged toward a retracted position shown in broken lines in FIG. 2 by the spreading force exerted by the torsion spring 20 on the outer links 41. This urges the disk 15 toward the retracted position in broken lines in FIG. 1. The linkage is capable of extending, however, upon movement of the knees 42 toward each other, as shown in full in FIG. 2, in response to a pressure differential on the disk of sufficient magnitude to overcome the light spring force. Although this arrangement is somewhat more complex and expensive than a simple coiled spring, it is believed that the spring force obtained in this manner with different degrees of extension, and the movement of the disk in response to changes in supply pressure, provide more accurate control of the volume of air flow.

Inward motion of the disk 15 may be limited in various ways to determine the retracted position of the disk. For example, abutments (not shown) may be provided in the guide rods 30 to stop the rollers 33, or on the linkage 41, 43 for the disk to prevent further spreading of the links when the disk is fully retracted. To produce a pressure differential on the disk when the system begins to operate with the disk retracted, the outlet pipe is close enough to the plate 19 to restrict the area of the passage 18 to less than the area of the duct. Thus, there is a static pressure drop in the air passing through the restricted passage and spreading into the interior of the case 12 beyond the outlet pipe 29.

In the extended position of the disk 15 (FIG. 2), the outlet pipe 29 is closely adjacent the plate 19. To adjust the volume of flow that will be produced by any given supply pressure, the retracting force exerted by the spring 20 may be adjusted simply by adjusting the nut 40 on the outer end of the stud 38. As the nut is loosened, the spring is permitted to unwind and reduce its force in the retracted position and, conversely, tightening of the nut draws the pivot pin 35 outwardly to increase the spring force. As the retracting force is increased, the change in the area of the outlet passage produced by any increase in supply pressure is correspondingly reduced.

With the arrangement above described, the movable disk 15 is retracted by the spring 20 to the broken line position shown in FIG. 1 where there is no air flowing through the duct 11 and the pressures on opposite sides of the disk are equal. When air is supplied to the duct and begins to flow through the chamber 17, the outlet pipe 29 and the passage 18 to the discharge chamber outside the movable disk, static pressure builds up on the area of the disk inside the chamber 17 to a level determined by the supply pressure. At the same time, the static pressure on the outside of the disk increases to a limited and lesser extent as a result of the flow of air through the restricted passage 18 to the openings 28. As a result of the pressure differential thus produced on opposite sides of the disk, the latter is pushed outwardly against the action of the spring by an amount determined by the magnitude of the pressure differential and the force exerted on the spring, thereby reducing the area of the outlet passage 18.

If the supply pressure remains constant, the pressure differential becomes balanced by the spring force with the disk 15 stationary. Should the supply pressure begin to increase, the static pressure acting inside of the disk and the pressure differential acting to expand the chamber 17 correspondingly increase to push the disk closer to the valve plate 19 and reduce the area of the outlet passage 18 to maintain the volume of flow substantially constant. Decreases in the supply pressure are accompandied by corresponding reductions in the pressure differential to contract the chamber 17 and increase the flow area.

From the foregoing, it will be evident that the controller 10 is responsive to changes in the supply pressure to regulate the outlet area of the controller and thus maintain the volume of flow substantially constant despite wide fluctuations in the supply pressure. Moreover, the controller is relatively simple and inexpensive in construction, and is trouble-free and quiet in operation.

I claim as my invention:

1. In a flow controller, the combination of, a duct for carrying a flow of gas and having an outlet end for discharging the gas, a first disk substantially larger than said duct having a central opening telescoped onto said outlet end and secured thereto, a similar second disk spaced outwardly from said outlet end and having a central opening alined therewith and defining an outlet, an axially flexible sleeve joined at its ends to the outer portions of said disks and cooperating with the latter to form an axially expansible and contractible chamber for carrying the flow of gas from said duct through said outlet, a valve plate supported outside said chamber adjacent and in alinement with said outlet in the path of the gas discharged therethrough and cooperating with the outlet to define a restricted passage for the flow of air away from the outlet, said second disk being movable from a retracted position in which said outlet is spaced from said valve plate to an extended position in which the outlet is closely adjacent the plate thereby to vary the area of said passage in accordance with the position of such second disk, and a spring yieldably urging said second disk toward said retracted position whereby variations in the pressure differential acting on said second disk expand and contract said chamber to move said second disk toward and away from said valve plate thereby automatically varying the area of said passage to maintain the volume of flow through the latter substantially constant.

2. A flow controller as defined in claim 1 further including a pipe secured to said second disk around said outlet opening and projecting outwardly therefrom toward said valve plate.

3. A flow controller as defined in claim 2 in which said valve plate is at least as large as said pipe and closes the latter in said extended position.

4. A flow controller as defined in claim 2 in which said second disk is supported for axial motion on an elongated guide supported at one end on said valve plate and projecting inwardly through said pipe.

5. A flow controller as defined in claim 2 further including a toggle joint pivoted at its inner end on said duct and at its outer end on said second disk, said spring acting on said joint to draw said ends together and retract said second disk away from said valve plate.

References Cited

UNITED STATES PATENTS 2,926,046  2/1960  Blair _____ 137—517 X

FOREIGN PATENTS 74,364  11/1958  France.

M. CARY NELSON, *Primary Examiner.*

R. J. MILLER, *Assistant Examiner.*